United States Patent
Shintani et al.

[11] Patent Number: 6,111,677
[45] Date of Patent: Aug. 29, 2000

[54] OPTICAL REMOTE CONTROL INTERFACE SYSTEM AND METHOD

[75] Inventors: Peter Rae Shintani, San Diego; Hirofumi Usui, Poway, both of Calif.

[73] Assignees: Sony Corporation, Tokyo, Japan; Sony Electronics, Inc., Park Ridge, N.J.

[21] Appl. No.: 09/144,007

[22] Filed: Aug. 31, 1998

[51] Int. Cl.[7] .................................................. H04B 10/00
[52] U.S. Cl. .................... 359/142; 359/146; 359/174; 340/825.72; 348/734
[58] Field of Search .......................... 359/142, 145–146, 359/172–174; 340/825.72; 455/151.2; 348/734

[56] References Cited

U.S. PATENT DOCUMENTS

| | | | |
|---|---|---|---|
| 4,709,412 | 11/1987 | Seymour et al. | 359/145 |
| 5,307,193 | 4/1994 | VanZeeland et al. | 359/145 |
| 5,602,664 | 2/1997 | Doyle | 359/142 |

FOREIGN PATENT DOCUMENTS

| | | | |
|---|---|---|---|
| 0245742 | 10/1987 | Japan | 359/145 |
| 2 219 164 | 11/1989 | United Kingdom | 359/145 |

*Primary Examiner*—Kinfe-Michael Negash
*Attorney, Agent, or Firm*—Blakely, Sokoloff, Taylor & Zafman LLP

[57] ABSTRACT

The present invention is a method and apparatus for controlling a device by a remote controller. A receiving unit receives a first signal emitted by the remote controller and converts the received signal into a data stream. A communication medium carries the data stream from the receiving unit. A transmitting unit receives the data stream from the communication medium and converts the received data stream into a second signal compatible with the device.

27 Claims, 6 Drawing Sheets

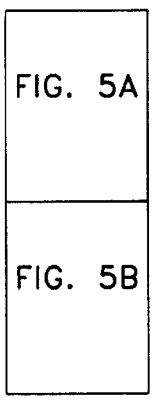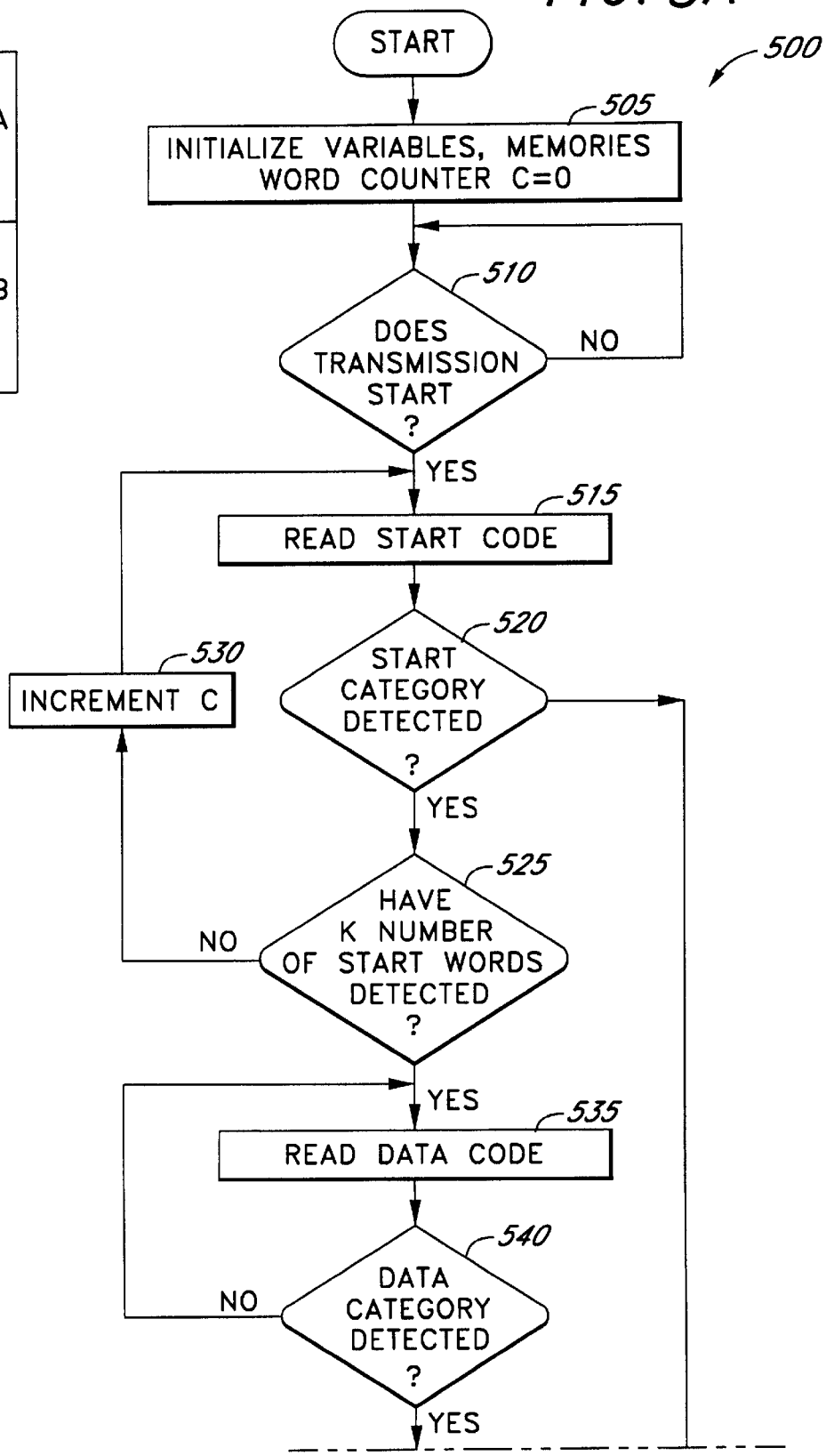

OPTICAL REMOTE CONTROL INTERFACE SYSTEM AND METHOD

BACKGROUND OF THE INVENTION

1. Field of the Invention

The present invention relates in general to control systems and more particularly to a system and method for providing an optical remote control interface.

2. Description of Art Related to the Invention

With increasing use of electronic equipment such as audio and video devices, there is also a corresponding increase in the use of remote control units for accessing the electronic equipment. However, when the equipment is not within the range of the remote control, it is difficult to provide control signals to the equipment. The user is thus unable to access equipment that is outside the operational range of a corresponding remote control device.

One solution to this problem is to configure electronic equipment is to support communications via a common communication interface. One such interface is the IEEE 1394-1995 serial digital bus, which is a low cost, high performance peripheral bus. To provide communications via the IEEE bus, a common communications protocol is implemented. Currently, one such communications protocol is the Home Audio video Interoperability (HAVi) software protocol. However, not all electronic devices are currently configured to support the IEEE 1394 serial bus, nor are they all configured to support the HAVi protocol.

Accordingly, there is a need in the technology for a system and method for providing an interface between an optical remote control device and the targeted device, so that access to remotely located devices, or devices that are outside the operational range of the remote control may be facilitated.

SUMMARY OF THE INVENTION

The present invention is a method and apparatus for controlling a device by a remote controller. A receiving unit receives a first signal emitted by the remote controller and converts the received signal into a data stream. A communication medium carries the data stream from the receiving unit. A transmitting unit receives the data stream from the communication medium and converts the received data stream into a second signal compatible with the device.

BRIEF DESCRIPTION OF THE DRAWINGS

The features and advantages of the present invention will become apparent from the following detailed description in combination with the figures listed below.

DESCRIPTION OF THE PREFERRED EMBODIMENT

The present invention therefore provides an apparatus and technique for controlling equipment or a device which is located out of the operational range of an optical remote controller. The apparatus comprises an optical receiving unit a serial bus, and an optical transmitting unit. Appropriate buffer memories are provided in both optical receiving and transmitting units to buffer the data and to match the carrier frequency and the transmission rate of the data to that of the serial bus. The technique converts an optical control signal into a sequence of digital commands that can be transmitted over a serial bus. The serial data stream includes packets that follow a predetermined format and timing requirements. Upon receiving the serial data over the serial bus, the processor in the optical transmitting unit performs data detection and unpacketization. The detected command data are then sent to an optical transmitter within the optical transmitting unit, which emits an optical signal to the optically controlled equipment or device.

Figure 1:
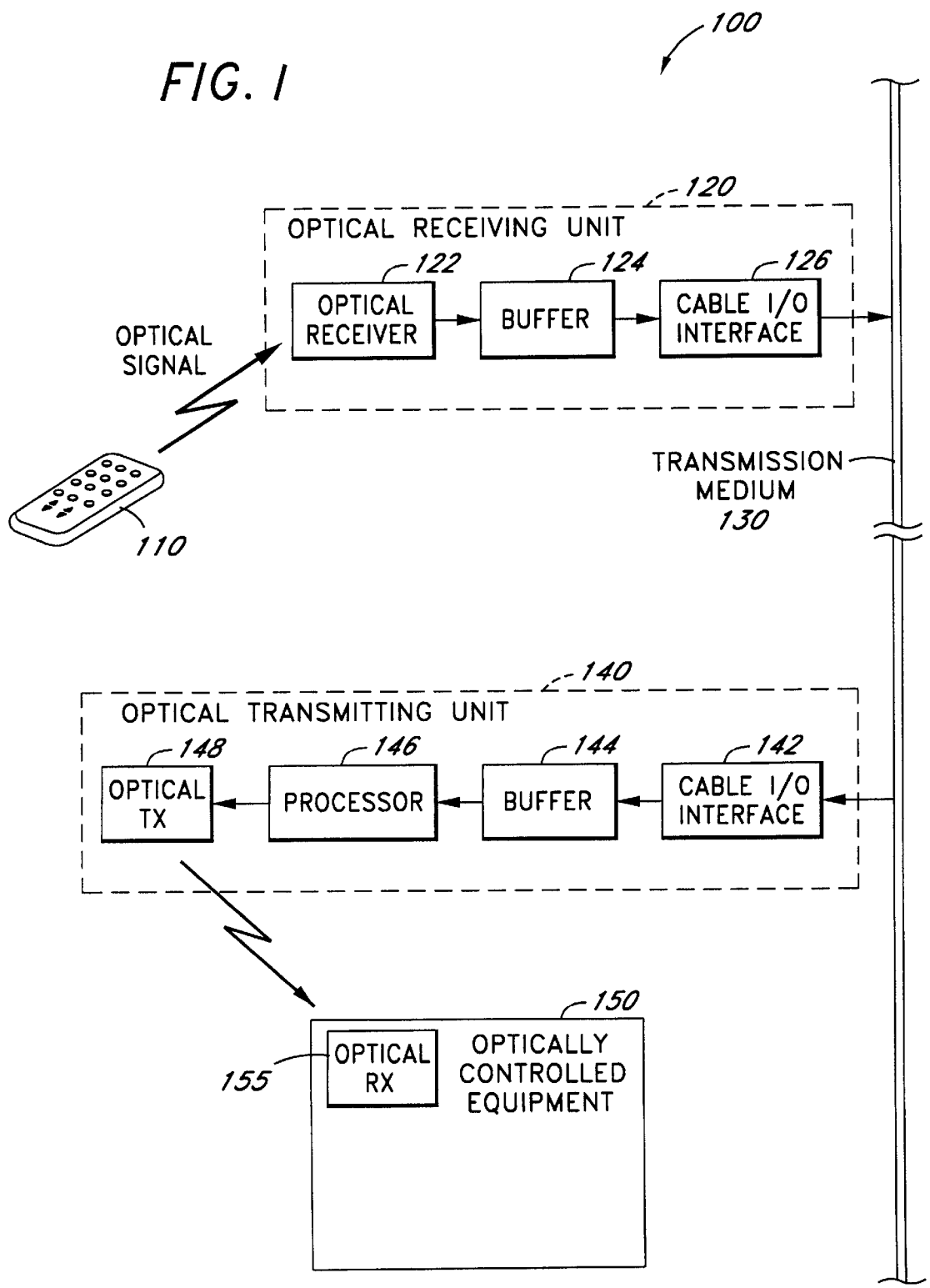
FIG. 1 illustrates one embodiment of an electronic system provided in accordance with the principles of the present invention.

FIG. 1 illustrates one embodiment of an electronic system provided in accordance with the principles of the present invention. The system 100 includes an optical remote controller 100 such as an infrared (IR) remote controller, an optical receiver unit 120 such as an IR receiver unit, a transmission medium 130, an optical transmitter unit 140 such as an IR transmitter unit, and an optically-controlled device or equipment 150, such as an IR-controlled device.

The optical remote controller 110 is any controller that can emit an optical signal, such as an IR signal. The optical remote controller 110 has a number of keys which may be depressed to support a corresponding number of functions. For example, the optical remote controller 110 include keys which when depressed, allow the use to issue specific commands, such as power on, channel selection, volume selection, etc.

The optical receiver unit 120 receives the optical signal and translates the received signal into a bit sequence that can be transmitted over the transmission medium 130. The optical receiver unit 120 includes an optical receiver 122, a buffer 124, and an input/output (I/O) interface 126. The optical receiver unit 122 receives the optical signal emitted by the optical remote controller 110 and converts the optical signal into a serial data stream in digital form. The buffer 124 is a memory device that stores the serial data forwarded by the optical receiver 122. In one embodiment, the storage capacity of the buffer 124 is sufficient to maintain a continuous transmission to the optically-controlled device 150 without noticeable interruption. The I/O interface 126 comprises interface circuits that convert the data provided from the buffer 124 into data compatible with the electrical characteristics of the transmission medium 130. In addition, the I/O interface packetizes the serial data in conformity with the IEEE 1394 serial bus protocol. In one embodiment, the communication protocol is one of an isochronous and an asynchronous formats.

In one embodiment, the transmission medium 130 comprises a cable that carries the serial data stream. In alternate embodiments, the transmission medium 130 may be any generally known transmission medium, including glass or plastic fiber optic cable, a radio frequency transmission link, or an infra-red link. In one embodiment, the transmission medium 130 is compatible with the IEEE-1394 electrical standard. In another embodiment, the cable 130 is of a length that is sufficient for maintaining signal integrity, as is known by one of ordinary skill in the art.

The transmission medium 130 carries the serial data stream to deliver to the receiving devices. Depending on the protocol of the serial bus, the serial data may be sent in a broadcast mode or to a specified destination. In the broadcast mode, all the de vice s link ed to the transmission medium 130 receive the data. The devices may decide to respond to the received IR commands in the serial data. Not all devices are responsive to the broad cast IR commands. To prevent inadvertent responses, the IR commands can be filtered at a transmission medium bridge or selectively blocked at the receiving device.

The optical transmitter unit 140 receives the serial data stream from the cable 130 and generates an optical signal to the optically-controlled device 150. The optical transmitter unit 140 includes a cable I/O interface 142, a buffer 144, a processor 146, and an optical transmitter 148.

The cable I/O interface 142 converts the serial data from the cable 130 into data having electrical characteristics compatible with the buffer 144. In addition, the cable I/O interface 142 may also perform some pre-processing functions such as unpacking the serial data. The buffer 144 stores the converted digital data stream in accordance with the processing time of the processor 146. The storage capacity of the buffer 144 is sufficient to maintain a continuous data transmission to the processor 146. The processor 146 may be any microprocessor that is capable of processing the serial data. In one embodiment, the processor 146 executes program code to support the Home Audio Video Interoperability (HAVi) protocol. The optical transmitter 148 receives the processed serial data and generates the corresponding optical signal to the optically-controlled device 150.

The optically-controlled device 150 may be any equipment or device that is controlled optically, for example, through an infra-red signal. Examples of the optically-controlled device 150 includes a television, audio and video equipment. The optically-controlled device 150 comprises an optical receiver 155 which can convert the optical signal to an electrical signal, which is subsequently utilized to perform various predetermined functions, such as powering on the device 150.

When an optical (e.g., infrared or IR) signal is generated by the remote controller, it is possible that the optically-controlled device 150 also receives the IR signal directly because it is within the operational range. To prevent the optically-controlled device 150 from responding to the IR commands twice, there are a number of methods. One way is to give the direct IR signal highest priority. Since there is a processing delay on the serial data path, the direct IR signal will arrive first. The optically-controlled device 150 will ignore any identical IR commands arriving via the serial data path for a predefined time period, such as 40 msec or 100 msec. This predefined period should be determined from the knowledge of the IR signal flight time and the processing time of the serial data.

In addition, the received optical command can be sampled at a low sampling rate, e.g., at least two times the bit rate of the demodulated optical command, and the digital sequence can be packetized according to a universal code standard, such as the EIA-754, DTV Digital Interface Standard.

Figure 2:
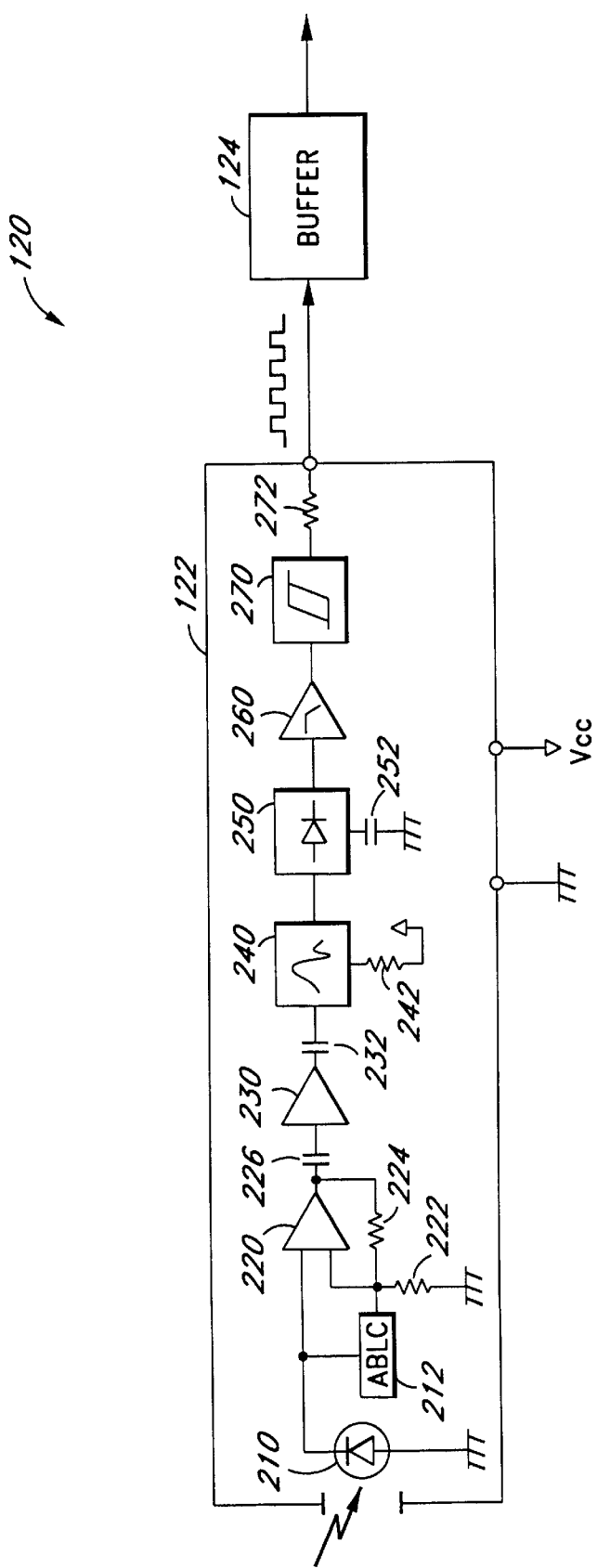
FIG. 2 is a detailed block diagram of one embodiment of the optical receiver 122 and the buffer 124 of FIG. 1.

FIG. 2 is a detailed block diagram of one embodiment of the optical receiver 122 and the buffer 124 of FIG. 1. The optical receiver 122 comprises a photodiode 210, an Automatic Brightness Level Control (ABLC) 212, a head amplifier 220, two gain resistors 222 and 224, a coupling capacitor 226, a limiter amplifier 230, a coupling capacitor 232, a bandpass filter (BPF) 240, a filter resistor 242, a detector/comparator 250, a capacitor 252, an integrator 260, a hysteresis comparator 270, and a matching resistor 272.

The photodiode 210 receives the emitted optical radiation and generates a voltage in response to the amount of optical radiation received. In one embodiment, the photodiode 210 is responsive to an incoming optical signal which has a carrier frequency from 40 KHz to 455 KHz, although the 40 KHz response is more common. The head amplifier 220 amplifies and conditions the photodiode voltage to within an appropriate or predetermined range. The resistors 222 and 224 provide proper gain control, while the coupling capacitor 226 removes any bias component in the signal. The limiter amplifier 230 limits the amplified voltage to within a specified range to avoid saturation. The coupling capacitor 232 provides further filtering of the bias component of the amplified voltage. The bandpass filter 240 subsequently eliminates unwanted components outside the frequency band of operation, while the detector/comparator 250 perfumes signal detection by thresholding the voltage to generate a binary level signal. The integrator 260 then provides a summing operation of the signal over the specified interval of the pulses. The hysteresis comparator 270 provides a final conversion of the serial pulses into appropriate pulses with specified width.

The result of the signal processing performed by optical receiver 122 is serial data having binary levels. The pulse width of the binary data is a function of the arrival distance from the optical remote controller 110 to the optical receiving unit 120. In one embodiment, this pulse width is between 400 $\mu$sec to 800 $\mu$sec.

The buffer 124 receives the serial data as generated by the optical receiver 122. The buffer 124 has sufficient storage capacity for transmission to the cable 130. In one embodiment, the buffer 124 is a static random access memory having an incremental addressing mechanism, e.g., a first in first out (FIFO) organization.

Figure 3:
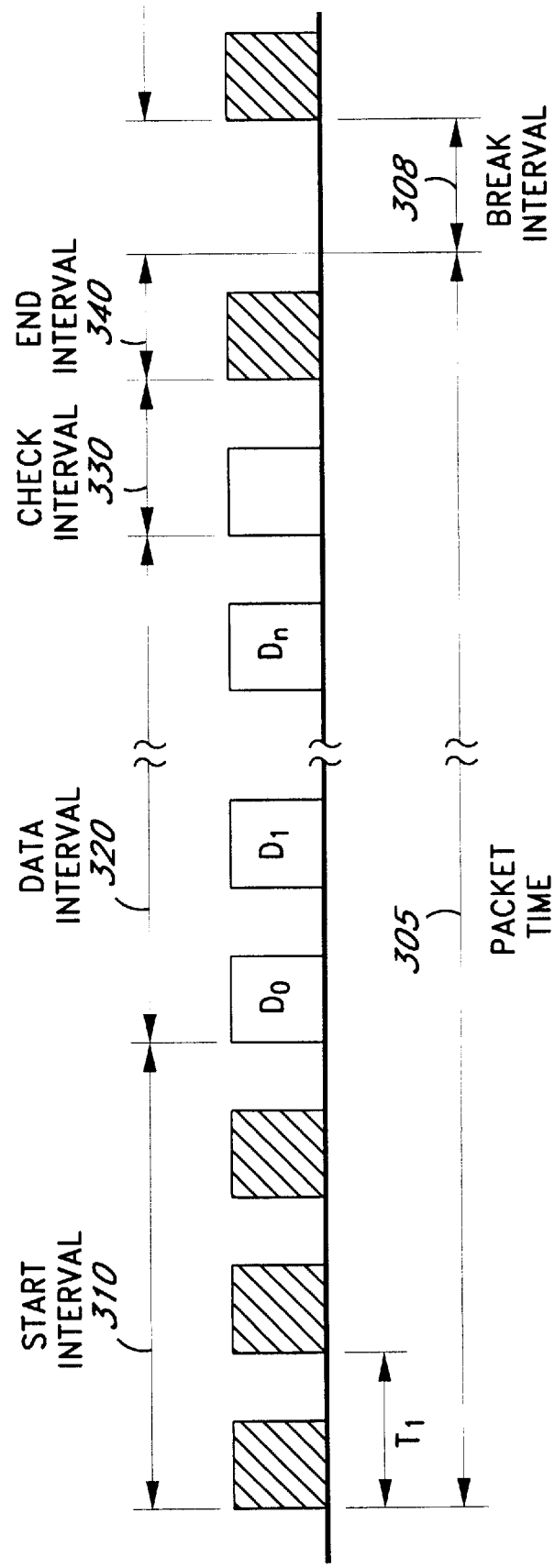
FIG. 3 illustrates one embodiment of the transmission format of the communication link provided from the optical receiving unit 120 to the optical transmitting unit 140 via the transmission medium 130 of FIG. 1.

FIG. 3 illustrates one embodiment of the transmission format of the communication link from the optical receiving unit 120 to optical transmitting unit 140 via the transmission medium 130 of FIG. 1. The transmission time includes a packet time interval T 305 and a break interval 306. The packet time interval 305 includes a start interval 310, a data interval 320, a check interval 330, an end interval 340. The format of a packet is as follows: one packet comprises 3 frames of the same start words, one or more data words, one frame of check word, and one frame of end word. In one embodiment, one frame of information is 45 msec. As is known by one skilled in the art, other frames or frame intervals may be defined.

The packet time interval T 305 is the time interval during which a packet is processed by the optical receiver unit 120 is transmitted over the cable 130. The length of the packet time interval T 305 depends on the number of data words. The start interval 310 is the time during which 3 frames of the same start words are transmitted. The data interval 320 is the time during which one or more data words are transmitted. There is normally no limit on the number of data words in the data interval. However, to avoid errors, the protocol may impose a maximum time interval for the data interval. The check interval 330 is the time during which a check word is transmitted. The check word is used to provide error detection for the data words. In one embodiment, the error checking is the parity error check. The end interval 340 is the time during which an end word is transmitted. The end word is used to declare the end of the packet.

In one embodiment, the check word is generated by performing an Exclusive OR (XOR) of the data words D1 to Dn. The following is an example of the generation of the check word for six data words D1 through D6,

| Check word = | D1 (XOR) D2 (XOR) D3 (XOR) D4 (XOR) D5 (XOR) D6 |
|---|---|
| D1 | 01000000 |
| D2 | 01010010 |
| D3 | 00100101 |
| D4 | 01000001 |
| D5 | 10011011 |
| D6 | 11011100 |
| Check word | 00110001 |

The break interval 308 indicates there is a break in the transmission, e.g., no valid data is being transmitted during the interval 308. During the break interval, the signal level is at a predetermined level. In one embodiment, this predetermined level is a logic zero. In one embodiment, the break interval 308 is 45 msec.

The information packet transmitted follow a predetermined format. In one embodiment, the format is used to distinguish four types of packets: the start word packet, the data word packet, the check word packet, and the end word packet. For each packet, there is a guide pulse which is an identification signal placed at the beginning of the packet. In one embodiment, the guide pulse is at a fixed logic level (e.g., HIGH) for a predetermined time period. The number of bits of the packet information is 15 which includes a 7-bit or 8-bit information code and an 8-bit category code. The 7-bit information code is one of a start code, a check code, and an end code, allowing 127 different kinds of transmission data. The 8-bit information code includes the data word in the packet. In one embodiment, the information packet after the guide pulse starts with the least significant bit (LSB). The packet also includes a category code which identifies the type of information transmitted and is assigned to each product category subject to the remote control system. For packets containing the data words, two types of category codes are used. Therefore, the data code for the data word can be assigned 256 kinds of transmission data.

The information packets are transmitted serially from the optical receiving unit 120 via the cable 130 to the optical transmitting unit 140. The timing values for the serial data are in accordance with the carrier frequency of the optical signal and the serial bus protocol. In one embodiment, these timing values are as follows:

| Type of information | Duration (in msec) | Tolerance (in msec) |
|---|---|---|
| Guide pulse time | 2.4 | +/−0.015 |
| Data bit off time | 0.6 | +/−0.015 |
| Data bit on time (HIGH) | 1.2 | +/−0.015 |
| Data bit on time (LOW) | 0.6 | +/−0.015 |
| Data period (HIGH) | 1.8 | +/−0.03 |
| Data period (LOW) | 1.2 | +/−0.03 |
| Output frame period | 45.0 | +/−1.2 |

Figure 4A:
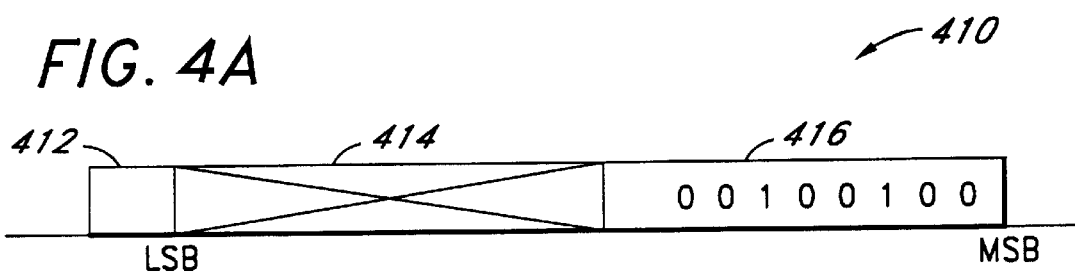
FIG. 4A illustrates one embodiment of the start word in the transmission format of FIG. 3.

FIG. 4A illustrates one embodiment of the start word in the transmission format of FIG. 3. The start word declares the start of the data transmission during the start interval. In one embodiment, three identical start words are transmitted. When the start word matches in the receiver side twice, the equipment is ready to be receiving data transmission.

The start word 410 includes a guide pulse 412, a start code 414, and a start category code 416. The start code 414 is a unique bit pattern that signifies that the information is a start word. The start category code 416 is a code that indicates the type of information being transmitted. In one embodiment, the start category code 416 is 00100100. In alternate embodiments, any other binary bit patterns can be used as the start category code 416.

Figure 4B:
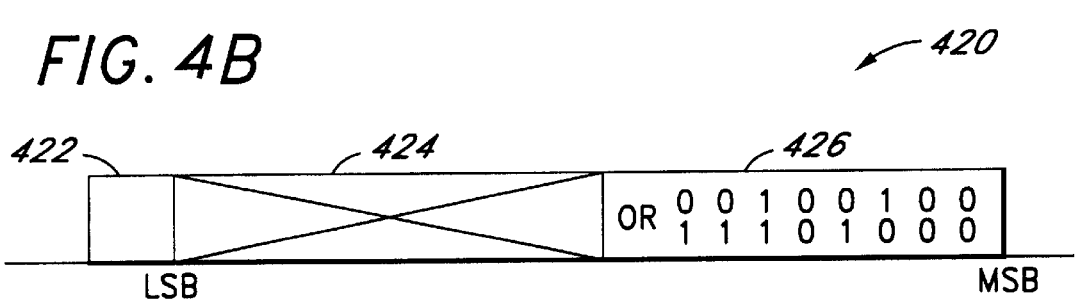
FIG. 4B illustrates one embodiment of the data word in the transmission format of FIG. 3.

FIG. 4B illustrates one embodiment of the data word in the transmission format of FIG. 3. The data word 420 includes a guide pulse 422, a data code 424, and a data category code 426. The data code 424 is a unique bit pattern that signifies that the information is a data word. The data category code 426 is a code that indicates the type of information being transmitted. In one embodiment, the data code is 00100100 or 11101000. In alternate embodiments, any other binary bit patterns can be used as the data category code 426.

Figure 4C:
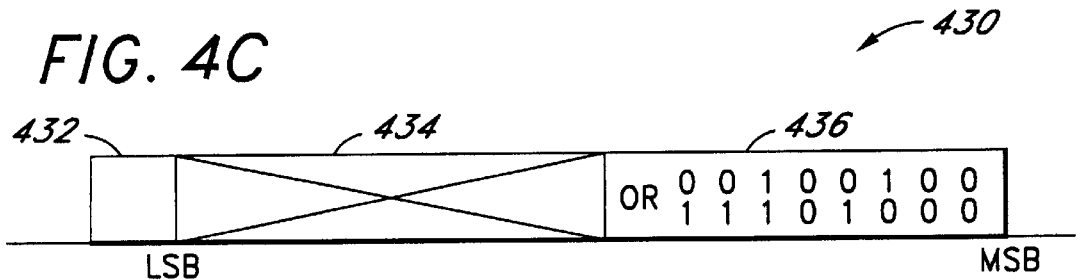
FIG. 4C illustrates one embodiment of the check word in the transmission format of FIG. 3.

FIG. 4C illustrates one embodiment of the check word in the transmission format of FIG. 3. The check word 430 includes a guide pulse 432, a check code 434, and a check category code 436. The check code 434 is a unique bit pattern that signifies that the information is a check word. The check category code 436 is a code that indicates the type of information being transmitted. In one embodiment, the check category code 436 is 00100100 or 11101000. In alternate embodiments, any other binary bit patterns can be used as the check category code 436.

Figure 4D:
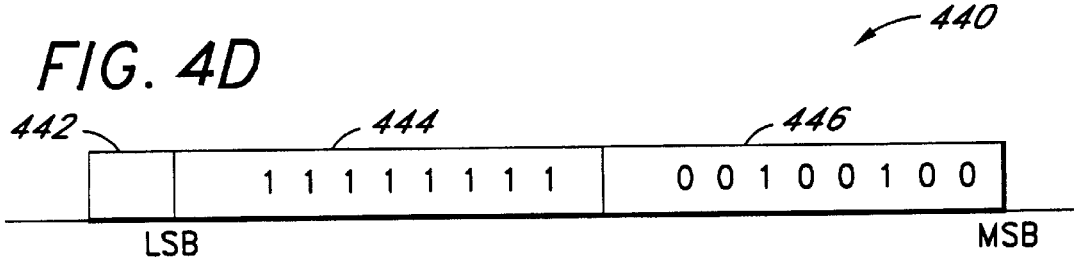
FIG. 4D illustrates one embodiment of the end word in the transmission format of FIG. 3.

FIG. 4D illustrates one embodiment of the end word in the transmission format of FIG. 3. The end word 440 includes a guide pulse 442, an end code 444, and an end category code 446. The end code 444 is a unique bit pattern that signifies that the information is a end word. The code category code 446 is a code that indicates the type of information being transmitted. In one embodiment, the category code 446 is 00100100. In alternate embodiments, any other binary bit patterns can be used as the end category code 446.

Figure 5B:
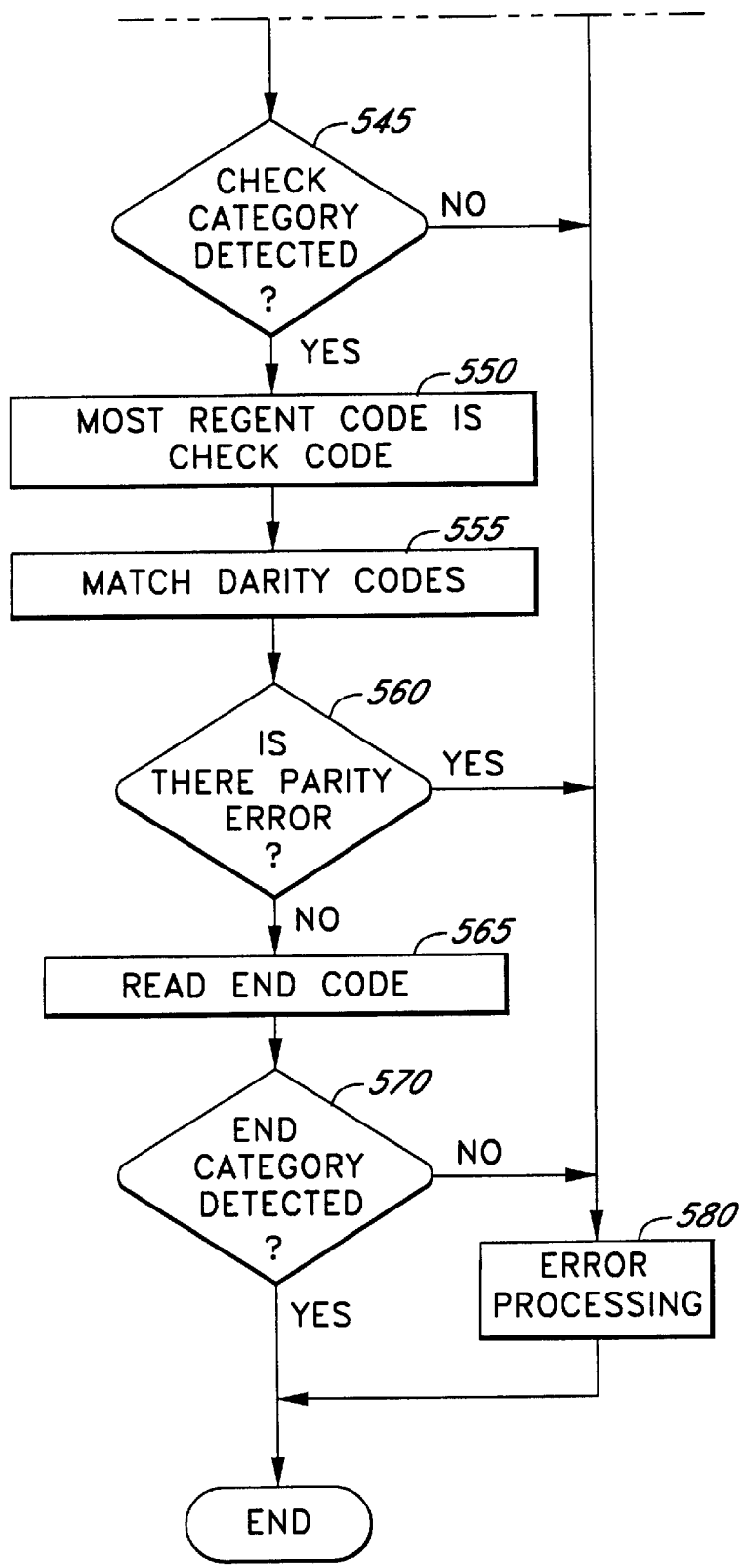
FIG. 5 is a flow chart illustrating one embodiment of the optical control and communication process provided in accordance with the principles of the present invention.

FIG. 5 is a flow chart illustrating one embodiment of the optical control and communication process provided in accordance with the principles of the present invention. The process 500 processes the received serial data from optical receiving unit 120 by the optical transmitter unit 140 via the transmission medium 130.

Upon START, the process 500 initializes the variables, data structures, buffers, etc. (block 505). The value C of the start counter is initialized to zero. The process 500 determines if transmission has started by detecting the presence of the guide pulse, e.g., guide pulse 412 of the start word 410 (block 510). If not, the process 500 returns to block 510 to continuously check for the guide pulse. If transmission has started, the process 500 determines if a start word is detected by reading the 7-bit start code, e.g., start code 414 (block 515) and matching the start category code, e.g., start category code 416 (e.g. 00100100), for start word 410 (block 520) with a predetermined value. If the start category code 416 does not match, then there is a transmission error, and the process 500 proceeds to block 580 for error processing. If the start category code 416 matches, the process 500 determines if K number of start words 410 have been detected by comparing the start counter value C with K (block 525), K being a predetermined number. In one embodiment, K is equal to 3. If K number of start words have not been detected, the process 500 increments the start counter value C by 1 (block 530) and returns back to block 515.

If K number of start words have been detected, the process 500 determines if a data word, e.g., data word 420, is detected by detecting the guide pulse 422 of data word 420, reading the data code, e.g., data code 424, (block 535), and matching the data category code, e.g., data category code 426, (i.e., 00100100 or 11101000) (block 540) with a predetermined value.

If the data category code 426 does not match, the process 500 returns to block 535. If the data category code 426 matches, the process 500 proceeds to determine if the check word, e.g., check word 430, is detected (block 545). This includes reading the guide pulse 432, the check code 434 and the check category code 436. If the check word 430 is not detected, there is a transmission error. In that case, the process 500 proceeds to perform error processing (block 580). If the check word 430 is detected, the process 500 obtains the check code from the most recent code (block 550). The check code represents the check error code, e.g., parity error. The process 500 then matches the parity codes between the check code and the computed code from the received data words. The process 500 then determines if there is parity error (block 560). If there is parity error, the process 500 proceeds to perform error processing (block 580). If there is no parity error, the process 500 determines if the end word has been detected by reading the end code 444 (block 565) and matching the end category code 446 with a predetermined value (block 570). If the end category code 446 is not detected, then there is a transmission error, and the process 500 proceeds to perform error processing (block 580). If the end category code 446 is detected, perform the process 500 terminates.

The present invention thus provides an apparatus and technique for controlling an equipment or a device which is located outside the operational range of an optical remote controller.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A system comprising:
   a receiving unit to provide a data stream, the receiving unit comprising:
      a signal receiver that receives a first signal from a remote controller for controlling a device, the signal receiver translating the first signal into a sequence of data code, the signal receiver inserting an information type into the sequence of data code and the signal receiver encoding the inserted sequence of data code to provide a data stream;
      a receiver buffer coupled to the signal receiver, that stores the data stream, to match a transmission rate; and
   a communication medium coupled to the receiving unit that carries the data stream.

2. The system of claim 1, wherein the communication medium is compatible with a 1394 serial bus.

3. The system of claim 2, wherein the communication medium is one of: an electrical cable, a glass cable, a plastic cable, a fiber optic cable, and a radio frequency link.

4. The system of claim 1, wherein the first signal is an optical signal.

5. The system of claim 4, wherein the optical signal is an infrared signal.

6. A system comprising:
   a receiving unit that receives a first signal from a remote controller for controlling a device, the receiving unit translating the first signal into a sequence of data code, the receiving unit inserting an information type into the sequence of data code and the receiving unit encoding the inserted sequence or data code to provide a data stream;
   a communication medium coupled to the receiving unit to carry the data stream; and
   a transmitting unit coupled to the communication medium to receive the data stream, the transmitting unit comprising:
      a transmitter buffer that stores the data stream to match a processing rate,
      a processor coupled to the transmitter buffer, that processes data stream to produce a decoded data stream at the processing rate, and
      a signal transmitter coupled to the processor, that transits the decoded data stream into a second signal.

7. The system of claim 6, wherein the communication medium is compatible with a 1394 serial bus.

8. The system of claim 7, wherein the communication medium is one of: an electric cable, a glass cable, a plastic cable, a fiber optic cable, and a radio frequency link.

9. The system of claim 6, wherein the second signal is an optical signal.

10. The system of claim 9, wherein the optical signal is an infrared signal.

11. An apparatus comprising:
    a signal receiver that receives a signal, the signal receiver translating the received signal into a sequence of data code, the signal receiver inserting an information type into the sequence of data code, and the signal receiver encoding the inserted sequence of data code to provide a data stream for transmission at a transmission rate; and
    a receiver buffer coupled to the signal receiver, that stores the data stream to match the transmission rate.

12. The apparatus of claim 11, wherein the signal is an optical signal.

13. The apparatus of claim 12, wherein the optical signal is an infrared signal.

14. The apparatus of claim 11 further comprising a receiver medium interface coupled to the receiver buffer, that generates the data stream from the stored sequence of digital data.

15. An apparatus comprising:
    a transmitter buffer that stores a data stream to match a processing rate, the data stream being provided from a sequence of data code, the sequence of data code having an inserted information type, the sequence of data code being translated from a signal;
    a processor coupled to the transmitter buffer, that processes the data stream to produce a decoded data stream at the processing rate; and
    a signal transmitter coupled to the processor, that transmits the decoded data stream into the signal.

16. The apparatus of claim 15, wherein the signal is an optical signal.

17. The apparatus of claim 16, wherein the optical signal is an infrared signal.

18. The apparatus of claim 15 further comprising a transmitter medium interface coupled to the transmitter buffer, that receives the data stream.

19. A method comprising:

translating a signal into a sequence of data code;

inserting an information type into the sequence of data code;

encoding the inserted sequence of data code to provide a sequence of digital data for transmission at a transmission rate; and storing the sequence of digital data in a receiver buffer to match the transmission rate.

20. The method of claim 19, further comprising:

generating a data stream from the stored sequence of digital data by a receiver medium.

21. The method of claim 19, wherein the information type is one of: a start code, a data code, a check code, and an end code.

22. The method of claim 19, wherein the signal is an optical signal.

23. The method of claim 22, wherein the optical signal is an infrared signal.

24. A method comprising:

storing a data stream in a transmitter buffer to match a processing rate, the data stream being provided from a sequence of data code, the sequence of data code having an inserted information type, the sequence of data code being translated from a signal;

processing the data stream, by a processor, at the processing rate to produce a decoded data stream; and transmitting the decoded data stream into the signal by a signal transmitter.

25. The method of claim 24 further comprising receiving the data stream by a transmitter medium.

26. The method of claim 25 further comprising converting the data stream into data having electrical characteristics compatible with the transmitter buffer.

27. The method of claim 24, wherein processing the data stream comprises:

matching the information type in the data stream; and performing an error detection on the matched data stream.

* * * * *